Figure 1:
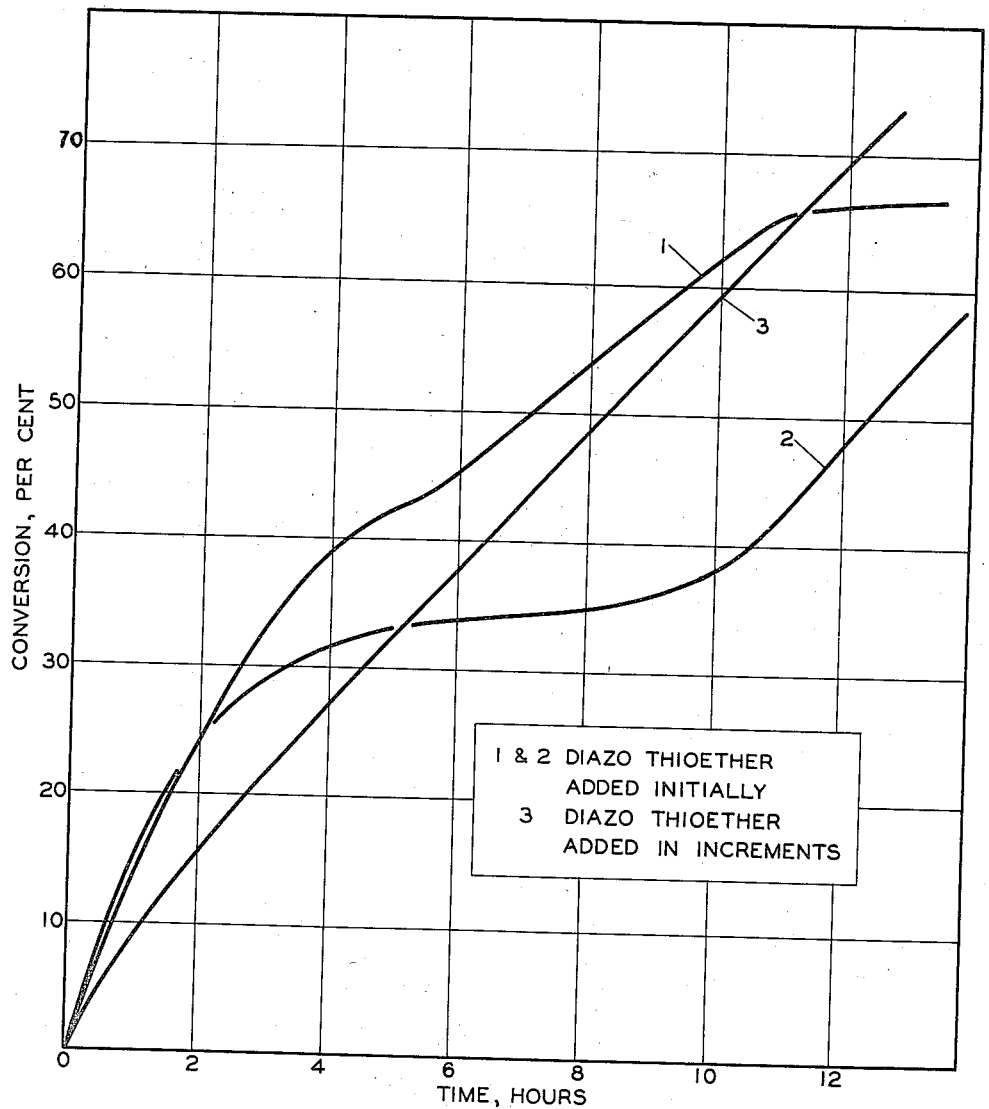

Patented Feb. 5, 1952

2,584,823

UNITED STATES PATENT OFFICE 2,584,823

STEPWISE ADDITION OF A DIAZO THIO-ETHER IN EMULSION POLYMERIZATION

Charles M. Tucker, Phillips, and Wayne E. Wells, Borger, Tex., assignors to Phillips Petroleum Company, a corporation of Delaware Application May 19, 1947, Serial No. 749,066

5 Claims. (Cl. 260—84.1)

This invention relates to the polymerization of unsaturated organic compounds capable of undergoing an addition polymerization to form high molecular weight polymers. In one of its more specific aspects it relates to the polymerization of an aliphatic conjugated diene hydrocarbon, including substituted derivatives, either alone or in admixture with a monomer copolymerizable therewith, to form long chain polymers of the type known as synthetic rubbers. In a still more specific aspect it relates to the polymerization of a butadiene-1,3 hydrocarbon and a monomer copolymerizable therewith in an aqueous dispersion.

Emulsion polymerization recipes wherein diazo thioether - ferricyanide - mercaptan compositions are employed as initiator-modifiers possess certain advantages in the production of synthetic rubber. These recipes have widespread application in view of the fact that numerous variations may be introduced, not only in the additive compositions themselves but in the monomers chosen, the temperature of operation, the emulsifying agents, and the like. However, when operating in this manner a very rapid initial reaction rate, accompanied by a sudden temperature rise if heat transfer is inadequate, is observed, followed by a noticeable decrease in the rate of monomer conversion as the reaction proceeds. The lack of uniformity in conversion rate, that is, the inability to control the reaction by methods heretofore employed, represents a serious drawback in the use of these recipes, particularly where large scale plant operations are concerned. The increase in temperature or heat build-up, resulting from inadequate heat transfer methods, produces deleterious effects on the resulting polymer. Inasmuch as this method of effecting emulsion polymerization reactions has assumed increasing importance in the production of synthetic rubber, a means of controlling the reaction rate would represent a definite advance in the art.

We have now found a method whereby emulsion polymerization reactions using diazo thioether-ferricyanide-mercaptan recipes can be controlled in such a way that the rapid initial reaction rate, accompanied by a sudden rise in temperature, is averted and the reaction will proceed at a substantially uniform rate until the desired degree of conversion is reached. The method comprises the incorporation of only a small quantity of the diazo thioether at the beginning of the reaction followed by the continuous slow addition or, if preferred, intermittent addition of small quantities of the diazo thioether throughout the reaction period. When operating in this manner the problem of heat transfer no longer presents the difficulties that arise when the diazo thioether is charged, as it is in the conventional procedure, at the beginning of the reaction. Furthermore, when the entire quantity of diazo thioether is charged initially, there is a sharp reversal in the slope of the time-conversion curve after the early stages of the reaction have passed. In other words, the polymerization rate at the beginning of the reaction is very rapid but subsequently there is a pronounced decrease after which there is again an increase. Heretofore no convenient or satisfactory method has been found for controlling the reaction rate. The present invention provides a method whereby control of the rate of polymerization reactions using diazo thioether-ferricyanide-mercaptan recipes is insured and the difficulties of former operating methods are overcome.

The monomeric material polymerized to produce polymers by the process of this invention comprises unsaturated organic compounds which generally contain the characteristic structure $CH_2=C<$ and, in most cases, have at least one of the disconnected valencies attached to an electronegative group, that is, a group which increases the polar character of the molecule such as a chlorine group or an organic group containing a double or triple bond such as vinyl, phenyl, nitrile, carboxy or the like. Included in this class of monomers are the conjugated butadienes or 1,3-butadienes such as butadiene (1,3-butadiene), 2,3-dimethyl-1,3-butadiene, isoprene, piperylene, 3-furyl-1,3-butadiene, 3 - methoxy-1,3-butadiene and the like; haloprenes, such as chloroprene, (2-chloro - 1,3 - butadiene) bromoprene, methyl chloroprene (2 - chloro-3-methyl-1,3-butadiene), and the like; aryl olefins such as styrene, various alkyl styrenes, p-chloro styrene, p-methoxy styrene, alpha-methyl styrene, vinyl naphthalene and similar derivatives thereof, and the like; acrylic and substituted acrylic acids and their esters, nitriles and amides such as acrylic acid, methacrylic acid, methyl acrylate, ethyl acrylate, methyl alpha-chloroacrylate, methyl methacrylate, ethyl methacrylate, butyl methacrylate, methyl ethacrylate, acrylonitrile, methacrylonitrile, methacrylamide and the like, methyl isopropenyl ketone, methyl vinyl ketone, methyl vinyl ether, vinylethinyl alkyl carbinols, vinyl acetate, vinyl chloride, vinylidene chloride, vinyl furane, vinyl carbazole, vinyl acetylene and other unsaturated hydrocarbons, esters, alcohols, acids, ethers, etc., of the types described. Such unsaturated compounds may be polymerized alone, in which case simple linear polymers are formed, or mixtures of two or more of such compounds which are copolymerizable with each other in aqueous emulsion may be polymerized to form linear copolymers.

The process of this invention is particularly effective when the monomeric material polymerized is a polymerizable aliphatic conjugated diolefin or a mixture of such a conjugated diolefin with lesser amounts of one or more other compounds containing an active $CH_2=C<$ group which are copolymerizable therewith such as aryl olefins, acrylic and substituted acrylic acids, esters, nitriles and amides, methyl isopropenyl ketone, vinyl chloride and similar compounds mentioned hereinabove. In this case the products of the polymerization are high molecular weight linear polymers and copolymers which are rubbery in character and may be called synthetic rubber. Although, as can be readily deduced from the foregoing, there is a host of possible reactants, the most readily and commercially available monomers at present are butadiene itself (1,3-butadiene) and styrene. The invention will, therefore, be more particularly discussed and exemplified with reference to these typical reactants.

One object of this invention is to polymerize unsaturated organic compounds.

Another object of this invention is to produce an improved synthetic rubber.

A further object of this invention is to produce a synthetic rubber by polymerization of a monomeric material in aqueous emulsion at temperatures lower than ordinarily used.

Still another object of this invention is to control the reaction rate in polymerizing unsaturated organic compounds in aqueous emulsion.

A still further object of this invention is to obtain more effective use of a diazo thioether in emulsion polymerization.

Other objects and advantages of this invention will become apparent, to one skilled in the art, from the accompanying disclosure and discussion.

The initiator-modifier components of this invention comprise diazo thioether-ferricyanide-mercaptan compositions which include a diazo thioether of the water soluble or oil soluble type, a ferricyanide such as potassium ferricyanide, and a mercaptan or blend of mercaptans. It is also generally preferred to operate in the presence of an alkaline-reacting material, or mixture of alkaline-reacting materials. Examples of these substances comprise compounds selected from the group consisting of alkali metal hydroxides, phosphates, and pyrophosphates. These act as buffers to aid in control of the pH of the emulsion. The initiator-modifier compositions employed in this invention are described in a copending application of Kolthoff and Dale, application Serial No. 751,954, filed June 20, 1947.

Emulsion polymerization recipes employing diazo thioether-ferricyanide-mercaptan compositions as initiator-modifiers are advantageous in many respects. They are particularly adaptable to low temperature operations since the reaction rate is sufficiently rapid to warrant their use. Another advantage is that rubber made by these recipes is of superior quality especially from the viewpoint of easy processability. However, when conventional techniques are employed, the polymerization proceeds at a rapid rate in the initial stages with the liberation of a considerable amount of heat since the reaction is exothermic in nature. This rapid initial reaction may result in a pronounced rise in temperature if heat transfer is inadequate and failure to dissipate the heat results in lack of control of the reaction with subsequent harmful effects on the polymer. Limitations of the plant equipment ordinarily used prevents adequate handling of the heat transfer problem and therefore, specially constructed equipment would be necessary in order to accomplish the desired results. The slow addition of the diazo thioether, continuously or intermittently during the reaction, provides a method whereby the conversion rate may be rigidly controlled, a polymer of excellent quality is produced, and available equipment may be employed.

Figure 2:
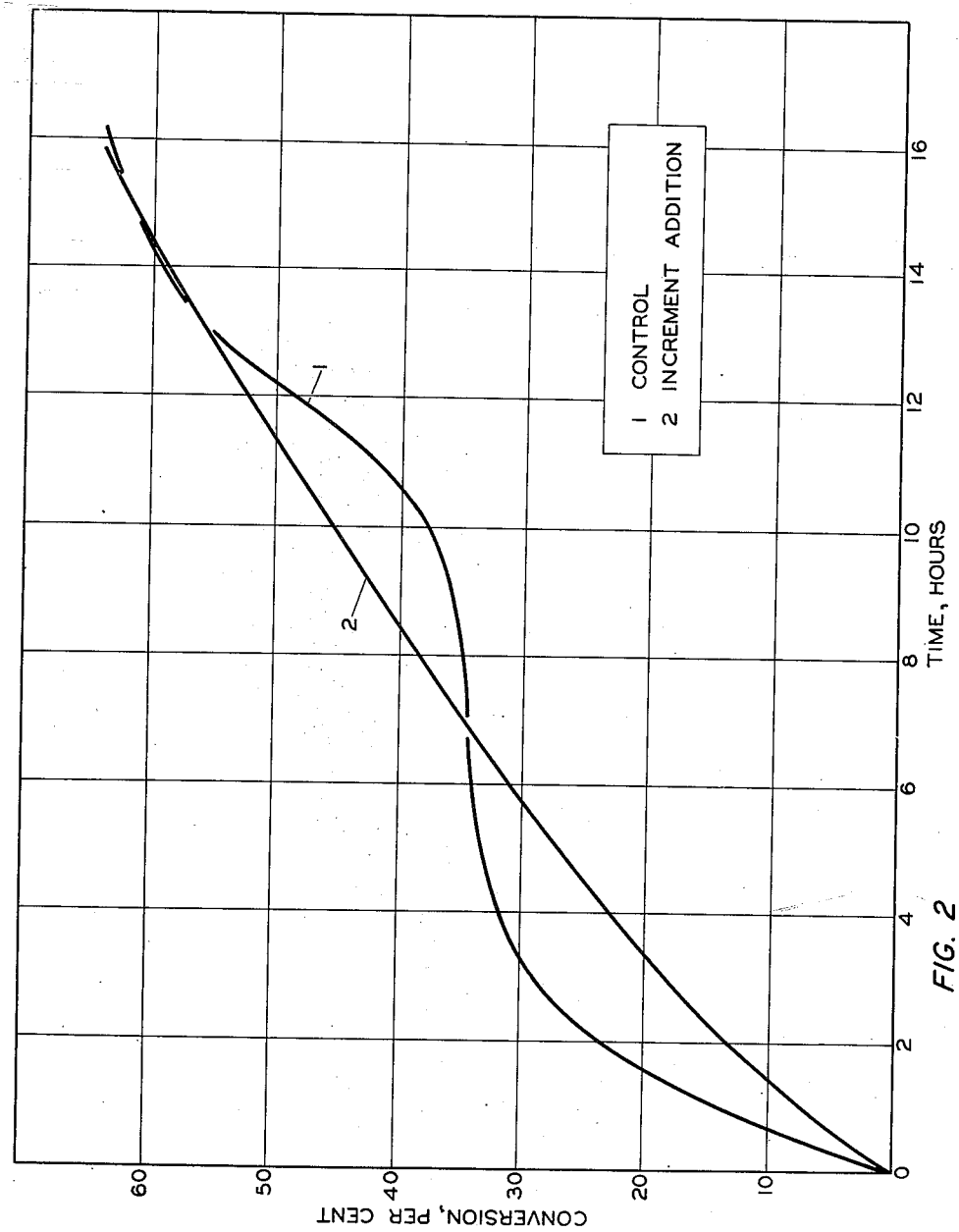

As hereinbefore mentioned, charging of the entire quantity of the diazo thioether initially results in an unusually rapid conversion rate in the early stages of the reaction followed by a period when a pronounced decrease in the rate occurs. Later in the polymerization period there is again an increase in the reaction rate. In Figure 1 is shown two typical time-conversion curves (curves 1 and 2) obtained from polymerization reactions in which the total quantity of diazo thioether was charged initially. In Figure 2 curve 1 is a typical time-conversion curve obtained from a polymerization reaction in which the total quantity of diazo thioether was charged. The rapid initial reaction rate followed by a pronounced decrease, evidenced by the change in slope of the curves, is clearly demonstrated. In contrast to these results, a curve is included (curve 3 in Figure 1 and curve 2 in Figure 2) which shows the time-conversion data obtained when a small amount of the diazo thioether was added initially and the remainder at about 1.5-hour intervals throughout the reaction. The steep portions of curves 1 and 2 of Figure 1 and curve 1 of Figure 2 are indicative of rapid polymerization rates which, as can be readily observed, occur in the early stages of the reaction and again at a later period. The flat portions indicate a sharp decrease in reaction rate. In contrast to these curves the nearly straight-line curve 3 of Figure 1 and curve 2 of Figure 2 are offered as evidence of the regularity of polymerization rate which is accomplished by the stepwise addition of the diazo thioether.

In order to illustrate the process of this invention, the following polymerization recipe, wherein a rosin soap is employed as the emulsifying agent, is presented:

| Ingredients: | Parts by weight |
| --- | --- |
| Butadiene | 70 |
| Styrene | 30 |
| Mercaptan | Variable |
| Diazo thioether[1] | Variable |
| Water | 250 or 180 |
| Rosin soap (pH 10.3) | 5.0 |
| Potassium ferricyanide | 0.3 |
| Trisodium phosphate ($Na_3PO_4 \cdot 12H_2O$) | 0.5 |

[1] The diazo thioether most frequently used is 2-(p-methoxybenzene diazo mercapto)-naphthalene.

The diazo thioether is dissolved in a small amount of the styrene and enough of this solution to contain about 0.01 to about 0.15 part diazo thioether is charged to the reactor together with the other ingredients. The emulsified reactants are agitated by conventional means at a desired temperature, and at intervals, say about every one to three hours, a small quantity of diazo thioether dissolved in styrene is introduced into the reactor, the amount added at each interval usually ranging from about 0.01 to about 0.15 part, if additions are made about each 1.5 to 2 hours. If preferred, the diazo thioether may be added continuously, the rate of introduction being so regulated that substantially the same total quantity is introduced as in cases where intermittent addition is practiced. When the desired conversion has been attained the reaction is shortstopped and the latex treated with an antioxidant, coagulated, and dried. If desired, the diazo tioether may be dissolved in a small quantity of benzene or other similar solvent instead of styrene and in this case all the styrene is charged to the reactor with the other ingredients at the beginning of the reaction. It cases where the diazo thioether used is water soluble, it is introduced into the reaction mixture in aqueous solution or, if preferred, is added in soap solution.

The diazo thioethers employed in the initiator-modifier compositions have the general structural formula R—N=N—S—R' wherein R is a member of the group consisting of aromatic and substituted aromatic radicals and R' is a member of the group consisting of aromatic, substituted aromatic, cycloalkyl, substituted cycloalkyl, aliphatic, and substituted aliphatic radicals. The diazo thio-ethers preferred for use as polymerization catalysts in accordance with the present invention are those in which both R and R' in the foregoing structural formula are aromatic or substituted aromatic groups. Examples of preferred compounds are substituted phenyl diazo thio-(naphthyl) ethers, phenyl diazo thio-(phenyl) ethers, naphthyl diazo thio-(phenyl) ethers, and naphthyl diazo thio-(naphthyl) ethers. Preferred substituent groups are the alkyl, alkoxy, aryloxy (e. g., phenoxy), carboxy, sulfo ($SO_3H$), halo, and nitro groups. Other substituents give diazo thio-ethers of varying degrees of usefulness. Among preferred compounds are those more fully described in an application of Reynolds and Cotton, Serial No. 641,866, filed January 17, 1946, now Patent 2,501,692, granted March 28, 1950, and are those represented by the formula

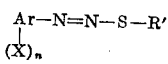

where Ar is an aryl group and X is a substituent selected from the group consisting of alkyl, alkoxy, aryl and aryloxy radicals; and R' is a member of the group consisting of aromatic, substituted aromatic, cycloalkyl, substituted cycloalkyl, aliphatic, and substituted aliphatic radicals. Specific examples are the following: p-methoxy phenyl diazo thio-(2-naphthyl) ether, dimethyl phenyl diazo thio-(2-naphthyl) ether, diamethyl phenyl diazo thio-(p-methoxy phenyl) ether, p-methoxy phenyl diazo thio-(o-carboxy phenyl) ether, p-sulfo phenyl diazo thio-(2-naphthyl) ether, p-sulfo phenyl diazo thio-(p-tolyl) ether, 2-naphthyl diazo thio-(carboxy phenyl) ether, and the like, together with the ammonium and alkali metal salts of such compounds. Some of the more important compounds may be conveniently represented by the formula

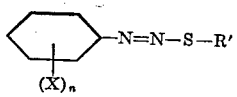

where X is a substituent selected from the group consisting of alkoxy and aryloxy radicals, n is an integer from one to four, and R' is a member of the group consisting of aromatic, substituted aromatic, cycloalkyl, substituted cycloalkyl, aliphatic, and substituted aliphatic radicals.

The total amount of diazo thioether used in the present process will generally range from about 0.05 to about 1.0 part per 100 parts monomers with about 0.10 to about 0.50 part being most frequently preferred. The amount is governed by the operating temperature and the quantities of the other catalytic materials present.

The ferricyanides which are applicable are those of the alkali metals, including ammonium. However, potassium ferricyanide is most generally preferred. The amount of ferricyanide employed may vary from about 0.03 to about 1 part per 100 parts monomers but the preferred amount usually ranges from about 0.05 to about 0.5 part. The amount of this and other catalyst constituents in any particular case will, of course, be somewhat dependent upon the amounts of other constituents, and optimum amounts can be readily determined by one skilled in the art.

The mercaptans which may be employed comprise those of primary, secondary, and tertiary configuration containing from four to twenty carbon atoms per molecule with those containing from about six to about sixteen carbon atoms per molecule being most generally preferred. While tertiary mercaptans are most widely used and in many cases are most desirable, primary and secondary mercaptans are sometimes advantageous. It is also frequently preferred to employ blends of mercaptans such as, for example, blends of tertiary $C_{12}$, $C_{14}$, and $C_{16}$ mercaptans.

The quantity of mercaptan used will vary depending upon the molecular weight and purity of the material as well as upon the results desired. For example, when tertiary $C_{12}$ mercaptan is employed, the amount generally varies within the range of about 0.05 to about 1.40 parts per 100 parts of monomer charged, with the narrower range of about 0.10 to about 0.45 part being most frequently preferred.

In general, the preferred pH range for carrying out polymerization reactions according to the method of this invention will usually lie between about 9.5 and about 11.5 and more frequently between about 10.8 and about 11.3. In cases where the pH of the emulsifying agent is low, it can be readily adjusted by the addition of a basic material such as sodium hydroxide prior to carrying out the polymerization. As hereinbefore mentioned, it is also frequently preferred to carry out the reaction in the presence of other alkaline reacting materials such as certain alkali metal salts, for example, phosphates and pyrophosphates. On account of their availability and relatively low cost, sodium compounds are more frequently employed than compounds of the other alkali metals. The amount of alkaline reacting material added depends upon the particular compound used and it is governed by the pH of the system. In the case of trisodium phosphate, for example, if the pH of the emulsifying agent is at least 9.5, the amount of the salt will generally range from 0.2 to 1.0 part.

When operating according to the method of this invention temperatures may range from about −30 to about 70° C. with temperatures from about −20 to about 50° C. usually preferred. Obviously when polymerizations are carried out in aqueous emulsion in the absence of freezing point depressants, temperatures below the freezing point of water cannot be employed. The use of various additive agents, however, makes a process of the type disclosed herein applicable at lower temperatures, and, in fact, this is one of the distinct advantages of the present invention. An example of such a low temperature system is a glycerin-water solution, and the term "aqueous emulsion" should be construed to include the use of an aqueous medium comprising water and a sufficient amount of a water-soluble component, preferably organic, to lower the freezing point below the desired polymerization temperature, whether or not the actual polymerization temperature is above or below 0° C. It is generally preferred that the emulsion be of an "oil in water" type, with the ratio of aqueous medium to monomeric material between about 1.5:1 and about 2.75:1, in parts by weight. At low ratios the emulsions tend to have high viscosities and at high ratios the yield per unit volume of reactor per unit of time is low. In the practice of the invention suitable means will be necessary to establish and maintain an emulsion and to remove reaction heat to maintain a desired reaction temperature. The polymerization may be conducted in batches, semicontinuously, or continuously. The total pressure on the reactants is preferably at least as great as the total vapor pressure of the mixture, so that the initial reactants will be present in liquid phase. When higher temperatures are employed, say between 40 and 60° C., some variations are usually introduced in the diazo thioether-ferricyanide-mercaptan compositions. For example, the amount of ferricyanide is generally decreased as the temperature is increased and may even be as low as 0.1 part.

The process herein described is particularly applicable to rosin soap systems although other emulsifying agents may be used if desired. Rosin soaps do not have the tendency to gel at low temperatures as do the usual fatty acid soaps and, therefore, certain advantages are to be gained through their use. In some instances, particularly at temperatures below 0° C., potassium oleate has been found to be a satisfactory emulsifying agent.

Advantages of this invention are illustrated by the following examples. The reactants, and their proportions, and the other specific ingredients of the recipes are presented as being typical and should not be construed to limit the invention unduly.

Example I

Two butadiene-styrene polymerizations were carried out using the following recipe:

Ingredients: Parts by weight
- Butadiene ---------------------- 70
- Styrene ------------------------ 30
- Mercaptan Blend [1] ------------ 0.4
- 2-(p-Methoxybenzene diazo mercapto)-naphthalene ---------- 0.3, 0.35
- Water -------------------------- 180
- Rosin soap (pH 10.3) ----------- 5.0
- Potassium ferricyanide --------- 0.3
- Trisodium phosphate ($Na_3PO_4 \cdot 12H_2O$) --------------- 0.5
- Sodium hydroxide --------------- 0.09

[1] A blend of tertiary $C_{12}$, $C_{14}$, and $C_{16}$ mercaptans in a ratio of 3:1:1 parts by weight.

In both runs the conventional polymerization procedure was followed while the temperature was held at 5° C. except that in one case, which served as a control, 0.3 part diazo thioether (2-(p-methoxybenzene diazo mercapto)-naphthalene) was added initially while in the other case the diazo thioether was dissolved in a small quantity of the styrene and an amount of solution equivalent to 0.05 part diazo thioether was charged initially followed by portions of the same size at each 1.5-hour interval during the reaction until a total of 0.35 part had been added. At the conclusion of each polymerization the latex was treated in the conventional manner with a short-stopping agent and then with an antioxidant after which it was coagulated and dried. The time-conversion data and Mooney values at final conversion are shown in the following table:

| Time, Hours | Conversion, Per Cent | |
|---|---|---|
| | Increment Addition | Control |
| 2 | 13.0 | 23.5 |
| 4 | 23.1 | 32.0 |
| 6 | 30.9 | 34.0 |
| 8 | 38.7 | 34.9 |
| 10 | 45.7 | 37.7 |
| 12 | 51.5 | 47.8 |
| 14 | 57.9 | 58.6 |
| 15.2 | 62.8 | |
| 16 | | 63.5 |
| Mooney, ML-4 | 40 | 66 |

The significance of these data is more clearly shown by reference to Figure 2. Similar improvements were obtained in a recipe in which 250 parts water was used.

Example II

The recipe of Example I was employed for carrying out a polymerization in a 260 gallon reactor. Small portions of 2-(p-methoxybenzene diazo mercapto)-naphthalene, each consisting of 0.05 part of the diazo thioether dissolved in a small quantity of styrene, were added, the first portion being introduced initially and the remaining amounts at 1.5-hour intervals over a 9-hour reaction period. A maximum temperature differential of only 16° F. between the reactor contents and jacket coolant was observed. The jacket coolant reached a minimum of 25° F. and averaged about 30° F. This is contrasted to the 5 to 10° F. level demanded in the jacket coolant when a control run was made in which all the diazo thioether was added initially. The polymerization temperature in the increment addition run and also in the control was maintained at 5° C. (41° F.).

As will be evident to those skilled in the art, various modifications of this invention can be made, or followed, in the light of the foregoing disclosure and discussion, without departing from the scope of the disclosure or from the scope of the claims.

We claim:
1. A process for the production of synthetic rubber, which comprises copolymerizing in aqueous emulsion having a pH between 9.5 and 11.5 a monomeric material comprising a major amount of 1,3-butadiene and a minor amount of styrene, adding to said reaction mixture prior to reaction 0.03 to 1 part of a water-soluble ferricyanide, 0.05 to 1.4 parts of a mercaptan having six to sixteen carbon atoms per molecule, and an initial increment of a diazo thioether having the formula R—N=N—S—R' wherein R is an aromatic radical and R' is a member of the group consisting of aromatic, cycloalkyl, and aliphatic radicals in an amount between 0.01 and 0.15 part, adding during the course of said copolymerization subsequent increments of a solution of such a diazo thioether in styrene in an amount of 0.01 to 0.15 part each 1.5 to 2 hours until a total amount between 0.05 and 1 part has been added, all parts being parts by weight based on 100 parts of said monomeric material, and recovering from effluents of said reaction synthetic rubber polymers so produced.

2. In a process of producing a synthetic rubber by batch copolymerization in an aqueous emulsion of a monomeric material comprising a major amount of 1,3-butadiene and a minor amount of styrene, the improvement which comprises conducting said polymerization at a temperature between −30 and 70° C. in the presence of 0.1 to 0.5 part of 2-(p-methoxybenzene diazo mercapto)-naphthalene, 0.05 to 0.5 part of potassium ferricyanide, 0.1 to 0.45 part of an alkyl mercaptan having twelve to sixteen inclusive carbon atoms per molecule, all being parts by weight per 100 parts of said monomeric material, with a ratio of aqueous medium to monomeric material between 1.5:1 and 2.75:1 by weight and with the pH of said emulsion between 9.5 and 11.5, said amount of said diazo thioether being added in a series of equal increments, the first at the start of the polymerization and subsequent increments as a solution in a portion of said styrene at intervals of one to three hours during the polymerization.

3. In the process of producing a synthetic rubber by copolymerization in an aqueous emulsion of a monomeric material comprising a major amount of 1,3-butadiene and a minor amount of styrene, the improvement which comprises conducting said polymerization in the presence of 0.05 to 1 part of a benzene diazo mercaptonaphthalene, 0.03 to 1 part of a water-soluble ferricyanide, 0.05 to 1.4 part of an alkyl mercaptan having four to twenty inclusive carbon atoms per molecule, all being parts by weight per 100 parts of said monomeric material, with the pH of said emulsion between 9.5 and 11.5, said amount of said diazo thioether being added in a series of increments, the first at the start of the polymerization and subsequent increments as a solution in a portion of said styrene at intervals of one to three hours during the polymerization.

4. A process for the production of a polymeric material of high molecular weight, which comprises polymerizing in an aqueous emulsion having a pH between 9.5 and 11.5 a monomeric material comprising an unsaturated organic compound having a $CH_2=C<$ group in the presence of 0.03 to 1 part of a water-soluble ferricyanide, 0.05 to 1.4 parts of an alkyl mercaptan having six to twenty carbon atoms per molecule, and a total amount of 0.05 to 1 part of a diazo thioether having the formula $R-N=N-S-R'$ wherein R is an aromatic radical and R' is a member of the group consisting of aromatic, cycloalkyl, and aliphatic radicals, adding an initial portion of 0.01 to 0.15 part of such a diazo thioether at the start of said polymerization, and each one to three hours during the course of said polymerization adding to said polymerization a solution of such a diazo thioether in such a monomeric material in an amount of 0.01 to 0.15 part of said diazo thioether.

5. The process of claim 4 in which said monomeric material comprises a conjugated diene.

CHARLES M. TUCKER.
WAYNE E. WELLS.

REFERENCES CITED

The following references are of record in the file of this patent:

UNITED STATES PATENTS

| Number | Name | Date |
|---|---|---|
| 1,896,491 | Luther | Feb. 7, 1933 |
| 2,118,864 | Reppe et al. | May 31, 1938 |
| 2,168,271 | Perquin et al. | Aug. 1, 1939 |
| 2,281,613 | Wollthan | May 5, 1942 |
| 2,310,780 | Hanford et al. | Feb. 9, 1943 |
| 2,397,201 | Pfau | Mar. 26, 1946 |
| 2,425,840 | Schulze | Aug. 19, 1947 |
| 2,501,692 | Reynolds et al. | Mar. 28, 1950 |